A. M. ALLEN.
Velocipede.

No. 91,896.

Patented June 29, 1869.

Witnesses
C. Wahlers
E. F. Kastenhuber

Inventor
Arthur M. Allen
Van Santvoord & Hauff
Attys

ARTHUR M. ALLEN, OF NEW YORK, N. Y.

Letters Patent No. 91,896, dated June 29, 1869.

IMPROVEMENT IN VELOCIPEDE.

The Schedule referred to in these Letters Patent and making part of the same.

*To all whom it may concern:*

Be it known that I, ARTHUR M. ALLEN, of the city, county, and State of New York, have invented a new and useful Improvement in Velocipedes; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
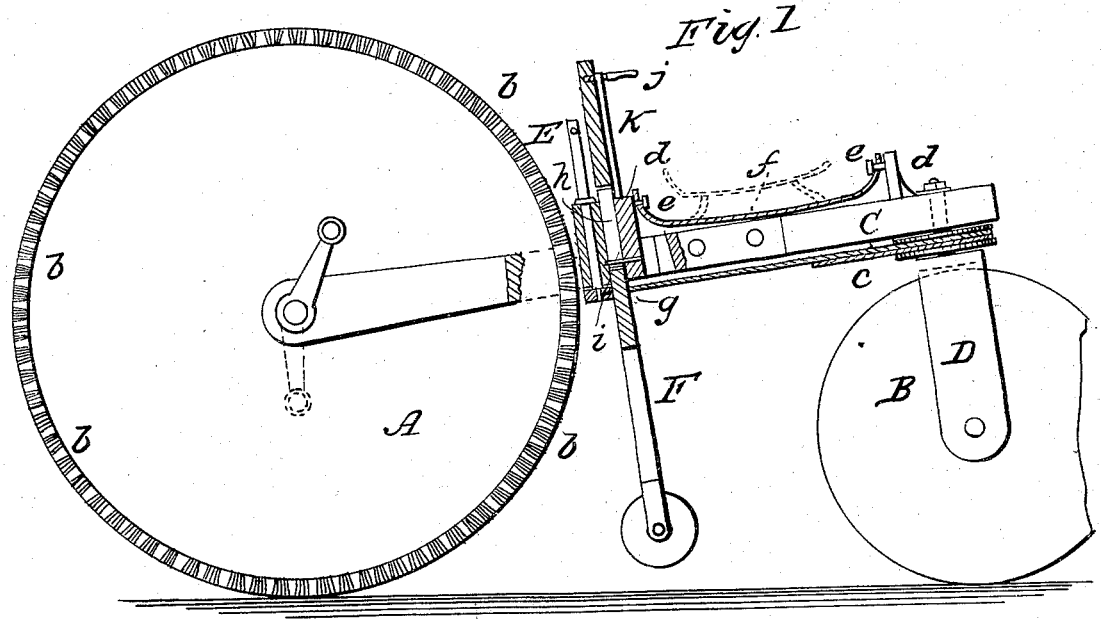
Figure 1 represents a sectional side elevation of this invention.
Figure 2:
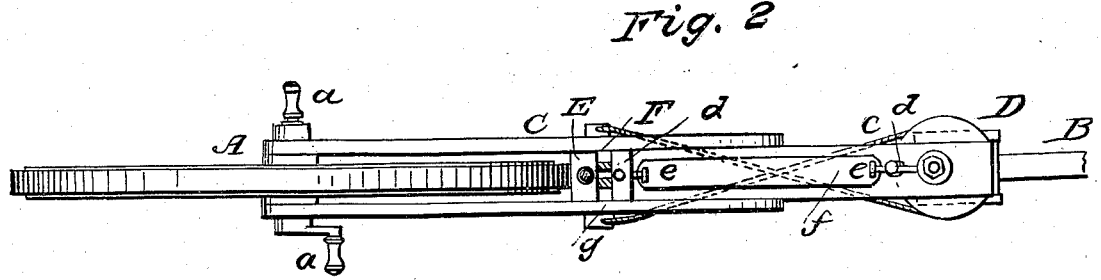
Figure 2 is a plan or top view of the same.

This invention consists in the arrangement of bristles on the periphery of the wheels of a velocipede, in such a manner that by said bristles the shocks and blows produced by stones or other uneven parts in the road are intercepted; and furthermore, the adhesion of the wheels to the ground over which they pass, is materially reduced, and the speed of the velocipede can be considerably increased without a corresponding increase in the power expended in the propulsion of said velocipede.

The invention consists, further, in the arrangement of a hinged swinging strap, under the saddle of a velocipede, in such a manner that the saddle is capable of retaining its horizontal position, independent of the inclined position which the velocipede is compelled to assume in turning curves.

The invention consists, also, in the arrangement of a roller-brace, which slides up and down in a mortise in the reach, and is capable of being raised from the ground or depressed thereon, and turned out on either side of the velocipede, in such a manner, that by said brace the machine can be steadied when the same is at rest, and when the velocipede is in motion, the roller-brace can be readily raised from the ground, and detained by a suitable stop or catch.

In the drawing, the letter A designates the driving-wheel of a velocipede, to which the required motion is imparted, by foot-cranks $a$, or in any other desirable manner.

From the periphery of this wheel projects or radiates a series of bristles, $b$, which are cut short, and set close together, and which serve to intercept shocks and blows produced by the unevenness of the road over which the velocipede passes, and which also prevents the wheel from adhering to the ground, so that a velocipede, provided with my wheels, can be run at much higher speed than a velocipede with wheels of an ordinary construction, which adhere to the ground over which they pass, and greatly embarrass the rapid motion of the velocipede.

Another advantage of the bristles is, that the same preserve a flat tread for the wheel when it is brought in an inclined position, and the slipping of the wheel in a lateral direction is prevented.

If desired, a scraper may be applied to keep the brush clean of dust.

It is obvious that the bristles can be applied with equal advantage to all the wheels of a velocipede.

The driving-wheel A is connected to the hind wheel B by means of a reach, C, and slotted standard D, in the usual manner, the hind wheel being so arranged that it can be made to act as the steering-wheel, being connected by a rope or chain, $c$, with the tiller E.

From the reach rise two standards, $d\ d$, which form the bearings for two pivots, $e\ e$, from which a strap, $f$, is suspended, as shown in the drawing.

This strap is intended to form the support for the saddle, and it is connected to its pivots $e\ e$, so that it can freely swing in either direction.

By these means, the saddle is enabled to retain its horizontal position, when the velocipede is brought in an inclined position, and the rider is enabled to retain his seat with greater convenience than he can when the saddle assumes an inclined position, as is the case in ordinary velocipedes, in turning curves, or whenever the velocipde assumes an inclined position.

The reach C is provided with a mortise, $g$, through which passes the roller-brace F.

This brace is provided with a long slot, $h$, that straddles a pin, $i$, secured in the reach, so that the brace can be raised and lowered, and also turned out in either direction.

Said brace is operated by means of a handle, $j$, secured in its upper end, and when the brace is raised, this handle is made to catch over the edge of a standard, $k$, which rises from the reach, so that it will retain the brace in its elevated position.

When the velocipede stops, the brace is lowered, and turned out toward one side, so that it prevents the machine from tipping over sideways, and retains the same in a convenient position for the rider to mount or dismount.

When the roller-brace is raised, and supported by the handle $j$ and standard $k$, it occupies a central position, in line with the wheels A B, and does not in any way interfere with the operation of the velocipede.

If desired, the roller-brace could be made angular, so that, by turning the same in one direction, the roller would be thrown out laterally, and by turning it in the opposite direction, it would be thrown in under the reach.

The rising and falling motion would, in this case, remain the same as before.

Having thus described my invention,

What I claim as new, and desire to secure by Letters Patent, is—

1. A velocipede-wheel, having its bearing-surface or tread of bristles, as a new article of manufacture, substantially as and for the purpose described.

2. The strap $f$, bent at both ends, in combination with pivots $e\ e$ and standards $d\ d$, substantially as and for the purpose described.

3. The roller-brace F, in combination with the mortise of the reach, and capable of being turned out in either direction, and of being raised and suspended in a central position, or in line with the driving-wheel, substantially as set forth.

ARTHUR M. ALLEN.

Witnesses:
W. HAUFF,
E. F. KASTENHUBER.